United States Patent
Lee et al.

(10) Patent No.: US 11,182,554 B2
(45) Date of Patent: *Nov. 23, 2021

(54) APPARATUS AND METHOD FOR EXECUTING APPLICATION

(71) Applicant: Samsung Electronics Co., Ltd., Suwon-si (KR)

(72) Inventors: Ji Hyun Lee, Hwaseong-si (KR); Kyoung Gu Woo, Seoul (KR); Seok Jin Hong, Hwaseong-si (KR); Yo Han Roh, Hwaseong-si (KR); Sang Hyun Yoo, Seoul (KR); Ho Dong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,787

(22) Filed: Jun. 5, 2019

(65) Prior Publication Data

US 2019/0286699 A1 Sep. 19, 2019

Related U.S. Application Data

(63) Continuation of application No. 14/698,409, filed on Apr. 28, 2015, now Pat. No. 10,417,333.

(30) Foreign Application Priority Data

May 8, 2014 (KR) .......................... 10-2014-0054998

(51) Int. Cl.
*G06F 40/279* (2020.01)
*G06F 40/40* (2020.01)
(Continued)

(52) U.S. Cl.
CPC .......... *G06F 40/279* (2020.01); *G06F 40/134* (2020.01); *G06F 40/169* (2020.01);
(Continued)

(58) Field of Classification Search
CPC .............. G06F 17/2247; G06F 17/2725; G06F 17/2872; G06F 17/24; G06F 19/707;
(Continued)

(56) References Cited

U.S. PATENT DOCUMENTS 8,812,316 B1 * 8/2014 Chen ....................... G10L 15/26
704/235
2005/0283805 A1 12/2005 Hirose
(Continued)

FOREIGN PATENT DOCUMENTS

JP 2010-166414 A 7/2010
JP 2012-033020 A 2/2012
(Continued)

OTHER PUBLICATIONS

Korean Office Action dated Oct. 30, 2020 in counterpart Korean Patent Application No. 10-2014-0054998 (5 pages in English and 8 pages in Korean).

*Primary Examiner* — Quoc A Tran
(74) *Attorney, Agent, or Firm* — NSIP Law (57) ABSTRACT

An apparatus and method for executing an application may execute a text string selected by a user or an application associated with a type of text string to input the text string to increase the user's convenience. The apparatus of executing an application includes a text string recognizer to determine a text string, a determiner to determine one or more candidate applications related to the text string, and an input location of the selected text string based on a type of the selected text string and the association model, an application list provider to generate and display a list of the
(Continued)

candidate applications, and an application executer to execute a candidate application selected from the list and to input the selected text string into the input location of the candidate application.

26 Claims, 10 Drawing Sheets (51) Int. Cl.

| | | |
|---|---|---|
| *G06F 40/134* | (2020.01) | |
| *G06F 40/169* | (2020.01) | |
| *G06F 40/00* | (2020.01) | |
| *G06F 40/58* | (2020.01) | |
| *G06F 40/232* | (2020.01) | |
| *G06F 40/274* | (2020.01) | |
| *G06F 17/00* | (2019.01) | |

(52) U.S. Cl.
CPC .............. *G06F 40/40* (2020.01); *G06F 40/00* (2020.01); *G06F 40/232* (2020.01); *G06F 40/274* (2020.01); *G06F 40/58* (2020.01)

(58) Field of Classification Search
CPC ...... G06F 17/28; G06F 17/2235; G06F 17/20; G06F 17/273; G06F 17/289; G06F 17/0237; G06F 17/276; G06F 3/048; G06F 3/04886; G06F 40/279; G06F 40/40; G06F 40/134; G06F 40/169; G06F 40/00; G06F 40/58; G06F 40/232; G06F 40/274

See application file for complete search history.

(56) References Cited

U.S. PATENT DOCUMENTS

| | | | |
|---|---|---|---|
| 2006/0247915 | A1 | 11/2006 | Bradford et al. |
| 2011/0028138 | A1* | 2/2011 | Davies-Moore ............................ H04M 1/72472 455/418 |
| 2011/0202836 | A1 | 8/2011 | Badger et al. |
| 2012/0016678 | A1* | 1/2012 | Gruber ................... G06F 40/30 704/275 |
| 2012/0197857 | A1 | 8/2012 | Huang et al. |
| 2012/0284247 | A1* | 11/2012 | Jiang ................... G06F 16/9535 707/706 |
| 2013/0097484 | A1 | 4/2013 | Nakamura |
| 2013/0339283 | A1* | 12/2013 | Grieves ............... G06F 3/04895 706/46 |
| 2014/0188889 | A1* | 7/2014 | Martens ............... H04N 21/466 707/740 |
| 2015/0066479 | A1 | 3/2015 | Pasupalak et al. |

FOREIGN PATENT DOCUMENTS

| | | |
|---|---|---|
| JP | 2013-003803 A | 1/2013 |
| KR | 10-2001-0008031 A | 2/2001 |
| KR | 10-2006-0057731 A | 5/2006 |
| KR | 10-2011-0123428 A | 11/2011 |
| KR | 10-2012-0101604 A | 9/2012 |
| KR | 10-2012-0130145 A | 11/2012 |
| KR | 10-2013-0024048 A | 3/2013 |
| WO | WO 02/37308 A1 | 5/2002 |

* cited by examiner

| | IMMEDIATE/SCHEDULED TRANSFER |
|---|---|

INPUT OF TRANSFER INFORMATION

SENDER ACCOUNT 123-123456-11-222 ▽

| CURRENT BALANCE | 2,260,000 |
|---|---|
| AMOUNT AVAILABLE TO BE TRANSFERED | 2,260,000 |
| ACCOUNT PASSWORD | **** |
| RECIPIENT ACCOUNT INFORMATION | |
| K BANK ▽ | 01098765432 — 520 |

TRANSFERRED AMOUNT 300,000

APPARATUS AND METHOD FOR EXECUTING APPLICATION

CROSS-REFERENCE TO RELATED APPLICATION(S)

This application is a Continuation Application of U.S. patent application Ser. No. 14/698,409, filed on Apr. 28, 2015, which claims the benefit under 35 U.S.C. § 119(a) of Korean Patent Application No. 10-2014-0054998, filed on May 8, 2014, in the Korean Intellectual Property Office, the entire disclosure of which is incorporated herein by reference for all purposes.

BACKGROUND

Field

The following description relates to an apparatus and method for executing application.

Description of Related Art

Due to the development and dissemination of mobile smart devices, a user performs various tasks, such as, for example, e-mailing, text messaging, web searching, internet banking, through the mobile smart devices. There are frequent cases in which simultaneous or sequential execution of several applications occurs.

A memo, an email, a text message may include information that is to be used in other applications. In many cases, the user checks the memo, email, text message to find the necessary information before or while executing another application. For example, when transferring money to an account number stored in the memo or written in a text message, the user may experience inconvenience, such as remembering the account number, writing it down on a paper, or copying it in a clipboard, then returning to a home screen, finding an internet banking program to execute it, and inputting the account number to which a deposit must be transferred.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, there is provided an apparatus of executing an application including a text string recognizer configured to determine a text string, a determiner configured to determine one or more candidate applications related to the text string, and to determine an input location of the selected text string in the one or more candidate applications based on a type of the selected text string and an association model, an application list provider configured to generate and display a list of the one or more candidate applications, and an application executer configured to execute a candidate application selected from the list and to input the selected text string into the input location of the selected candidate application.

The association model may include association information regarding the text string, a type of the text string, the application, and at least one input location of the text string in the application.

The apparatus of executing an application may include an association model manager configured to generate usage history information on the input text string and to generate or update the association model based on the usage history information, in response to the text string being input by a user.

The usage history information may include information regarding the text string input by the user, text string selected by the user, a type of the text string, an application where the text string has been input, and a location where the text string is input in the application.

The usage history information may include a predetermined text string in the application or an input frequency of a text string of a predetermined type, and the application list provider is configured to display a list where the one or more candidate applications are arranged in order of a highest input frequency.

The list may include one or more applications related to a type of the selected text string, and an input location of the selected text string in the one or more candidate applications.

The text string recognizer may be configured to determine a type of the text string based on one or more of a form of the text string, content of the text string, a context of a text that includes the text string, a size of the text string, a pattern of the text string, a location where the text string is selected, and a location where the text string is input.

The text string may be selected or input by a user.

The text string recognizer may be configured to determine the type of the text string based on a word or sentence in close proximity to the text string.

In another general aspect, there is provided a method for executing an application, including determining a type of a text string, determining one or more candidate applications related to the type of the text string, and an input location of the text string in the one or more candidate applications, based on an association model comprising the text string and association information between the text string and an application, generating a list of the one or more candidate applications, executing a candidate application selected from the list, and inputting the selected text string into the input location of the executed candidate application.

The association model may include association information regarding the text string, a type of the text string, the application, and an input location of the text string in the application.

The association model may be generated based on usage history information of the text string input by a user.

The usage history information may include information regarding the text string input by the user, text string selected by the user, a type of the text string, an application where the text string has been input, and a location where the text string is input in the application.

The usage history information may include a predetermined text string in the application or an input frequency of a text string of a predetermined type, and the displaying of the list comprises generating a list where the one or more candidate applications are arranged in order of a highest input frequency.

The list may include one or more applications related to the type of the selected text string, and an input location of the selected text string in the one or more candidate applications.

The determining of the type of the text string may include determining the type of the text string based one or more of a form of the text string, content of the text string, a context of a text that includes the text string, a size of the text string, a pattern of the text string, a location where the text string is selected, and a location where the text string is input.

In another general aspect, there is provided a method of generating an association model, including determining a type of a text string, an application where the text string is input, and an input location where the text string is input in the application, generating usage history information regarding the text string based on the text string, the type of the text string, the application where the text string is input, and a location where the text string is input, and generating an association model between the text string and the application based on the usage history information.

The determining of the type of the text string, the application, and the input location may include determining the type of the text string based on a form of the text string, a content of the text string a size of the text string, a pattern of the text string, and an input location where the text string is input.

The association model may include association information regarding the text string, the type of the text string, the application, and an input location of the text string in the application.

The generating of the association model may include creating the association model related to the text string, in response to the association model relating to the text string not being present in an association model storage.

Other features and aspects may be apparent from the following detailed description, the drawings, and the claims.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
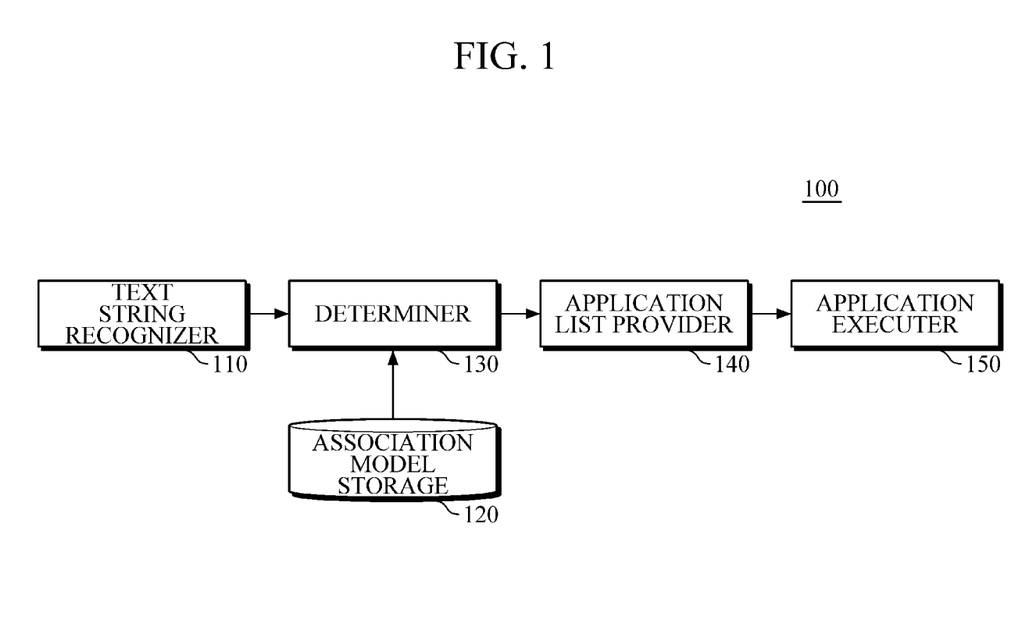
FIG. 1 is a diagram illustrating an example of an apparatus of executing an application.

FIG. 1 is a diagram illustrating an apparatus of executing an application. Referring to FIG. 1, an apparatus 100 of executing an application may include a text string recognizer 110, association model storage 120, a determiner 130, an application list provider 140, and an application executer 150.

The apparatus 100 may be a device to execute various applications. As a non-exhaustive illustration only, an apparatus 100 described herein may refer to mobile devices such as, for example, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths or the like), a personal computer (PC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, or any other device capable of wireless communication or network communication consistent with that disclosed herein.

The text string recognizer 110 may determine a type of the text string selected by the user or a type of text string input by the user. The text string selected by the user indicates the text string that the user selects from the text data displayed in the apparatus 100. Here, the selection of the text data may be performed through an input means employed by the apparatus 100. The input means may include means such as, for example, a mouse, a keyboard, voice recognition device, motion recognition device, and a touch screen. The user may input the text string in various manners, such as, for example, mouse dragging, keyboard input, touch screen input using a touch pen or fingers, and voice activated input.

The text string recognizer 110 may determine the type of text string by classifying the text string, selected or input by the user, according to various categories. The type of text string may include categories, such as, for example, a uniform resource locator (URL), an email address, a phone number, an account number, a location, a name, an ID, and a password.

The text string recognizer 110 may classify the type of text string into two or more categories. The type of text string may include two or more categories. For example, the text string recognizer 110 may classify the type of text string as a phone number and an account number when the text string selected or input by the user is composed of numbers.

The text string recognizer 110 may determine the type of text string based on a form of the text string. In this case, the text string form may indicate the type of text (e.g., numbers, marks, an alphabet, Korean, Japanese, etc.) that composes the text string, a length of the text string, or a pattern of the text string, etc.

For example, the text string recognizer 110 may determine the type of text string as a phone number or an account number when the text string is composed of numbers of a predetermined length. In another example, when the text string includes '@' and '.com', the type of text string may be determined to be an email address. In another example, when the selected text string starts with 'www.' and ends with '.com', the type of the text string may be determined to be a URL address.

In another example, the text string recognizer 110 may determine the type of the text string based on the content of the text string. For example, when the selected text string includes a place name or a word indicating a place, the type of the text string may be determined to be a location or a place.

In another example, the text string recognizer 110 may determine the type of the text string based on a context of a text included in the text string. For example, the text string recognizer 110 may determine the type of text string based on the meanings of the word or sentence positioned in the front or back of the text string selected by the user. For example, when the text string selected is composed of a combination of numbers, and in which the word "account" or "account number" is included in the front of the text string, the text string recognizer 110 may determine the type of the selected text string as an account number.

In another example, the text string recognizer 110 may determine the type of the text string based on the location where the text string is selected. For example, when a text message application is being executed, and in which the location where the text string is selected is a location that indicates a recipient number of the text message, the text string recognizer 110 may determine the selected text string as a phone number or a recipient number.

In another example, the text string recognizer 110 may determine the type of the text string based on the location where the text string is input. For example, when the location of the text string input by the user is a location where a name of a person is to be input in an address application, the text string recognizer 110 may determine the type of the input text string as a name of a person.

The association model storage 120 may store an association model including the association information between the text string and the application. Here, the association information may include information such as, for example, the text string, the type of text string, the application, and the input location of the text string in the application For example, the association model may be implemented according to a rule or as a form of a classifier, which composes the text string, the type of the text string, the application, and the input location of the text string in the application.

In an example, the association model may be stored in advance by a developer, or be generated or updated based on history information regarding the use of the text string in the apparatus 100.

The association model storage 120 may be non-transitory storage media of various forms, such as, for example, a flash memory type, a hard disk type, a multimedia card micro type, a card-typed memory (e.g., SD or XD memory, etc.), Random Access Memory (RAM), Static Random Access Memory (SRAM), Read-Only Memory (ROM), Electrically Erasable Programmable Read-Only Memory (EEPROM), Programmable Read-Only Memory (PROM), Compact Disc Read-only Memory (CD-ROMs), USBs, floppy disks, hard disks, optical recording media (e.g., CD-ROMs, or DVDs), and PC interfaces (e.g., PCI, PCI-express, Wi-Fi, etc.), magnetic tapes, magnetic memory, and magnetic disk.

The determiner 130 may determine a candidate application for the text string, and a location where the text string is to be input into the candidate application based on the association model stored in the association model storage 120 and the type of text string selected by the user. Here, the candidate application indicates an application installed in the apparatus 100 in which the text string selected by the user is to be input, or the application where the type of the selected text string may be input. There may be one or more candidate applications, and there may be one or more locations where the text string is to be input into a candidate application.

For example, when the type of the selected text string is URL, and in which a URL-related application in the association model is a web browser, the determiner 130 may determine the web browser as the candidate application related to the selected text string. For an input location of the web browser in the association model, the determiner 130 may determine the address window of the web browser to be the location where the selected URL text string is to be input.

In another example, when the type of the selected text string is a phone number, and when the application associated with the phone number in the association model is both a voice call application and a text message application, the determiner 130 may determine both the voice call application and the text message application as candidate applications. In addition, when locations, associated with the phone number among input locations of the voice call application in the association model, include both a recipient number input location and a caller number input location, the determiner 130 may determine both the recipient number input location and the caller number input location of the voice call application as the locations where a text string is to be input.

The application list provider 140 may generate a list of candidate applications and display it on a display screen of the apparatus 100. The list of candidate applications may include the candidate applications and the locations where a text string is to be input in each candidate application, both of which have been determined by the determiner 140.

When the user selects one candidate application from the list shown on the display screen, the application executer 150 may execute the selected candidate application. Also, the application executer 150 may input the text string, selected by the user, to a location where the text string is to be input in the executed candidate application.

Figure 2:
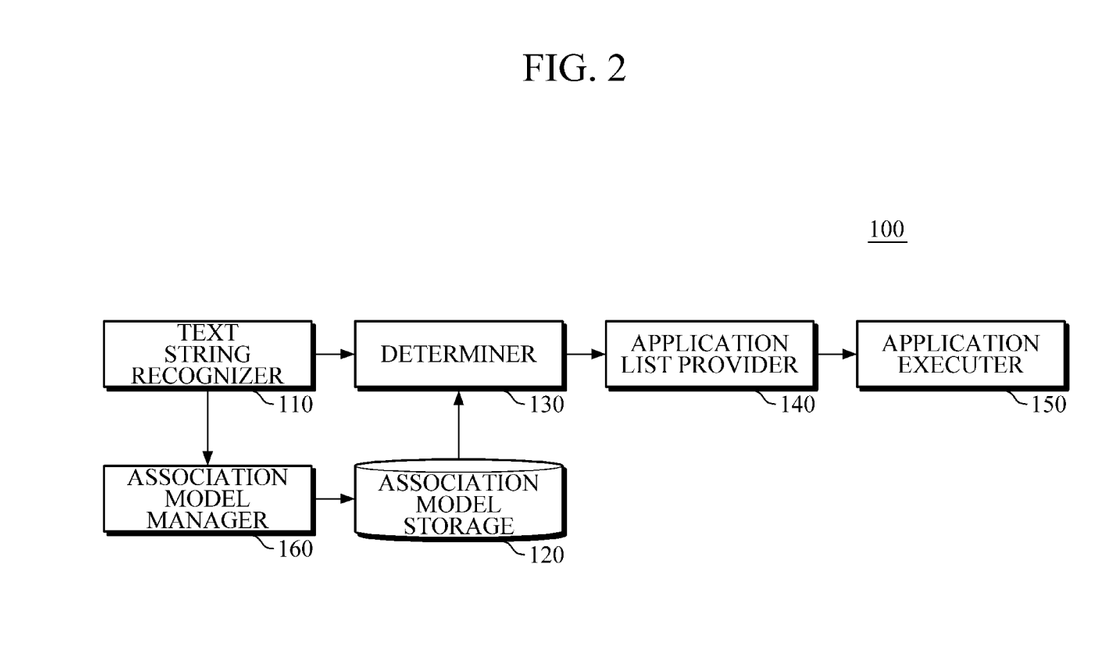
FIG. 2 is a diagram illustrating an example of an apparatus of executing an application.

FIG. 2 is a diagram illustrating an example of an apparatus of executing an application. Referring to FIG. 2, the apparatus may further include an association model manager 160.

When a text string is input by a user, the association model manager 160 may generate usage history information on the input text string. The usage history information may include information about a text string input by the user, a type of the input text string, an application where the text string is input, and a location where the text string is to be input in the application. The type of the text string input by the user may be determined by the text string recognizer 110.

When the text string input by the user or the association model associated with the type of the text string do not exist in association model storage 120, the association model manager 160 may generate a new association model by using the generated history information and store it in the association model storage 120.

When the text string input by the user or the association model associated with the type of the text string exists in association model storage 120, the association model manager 160 may update the existing association model stored in the association model storage 120 using the generated history information.

In an example, the usage history information on the input text string may include a frequency in which the same input text string or the same type as the input text string is input in the application.

Figure 3:
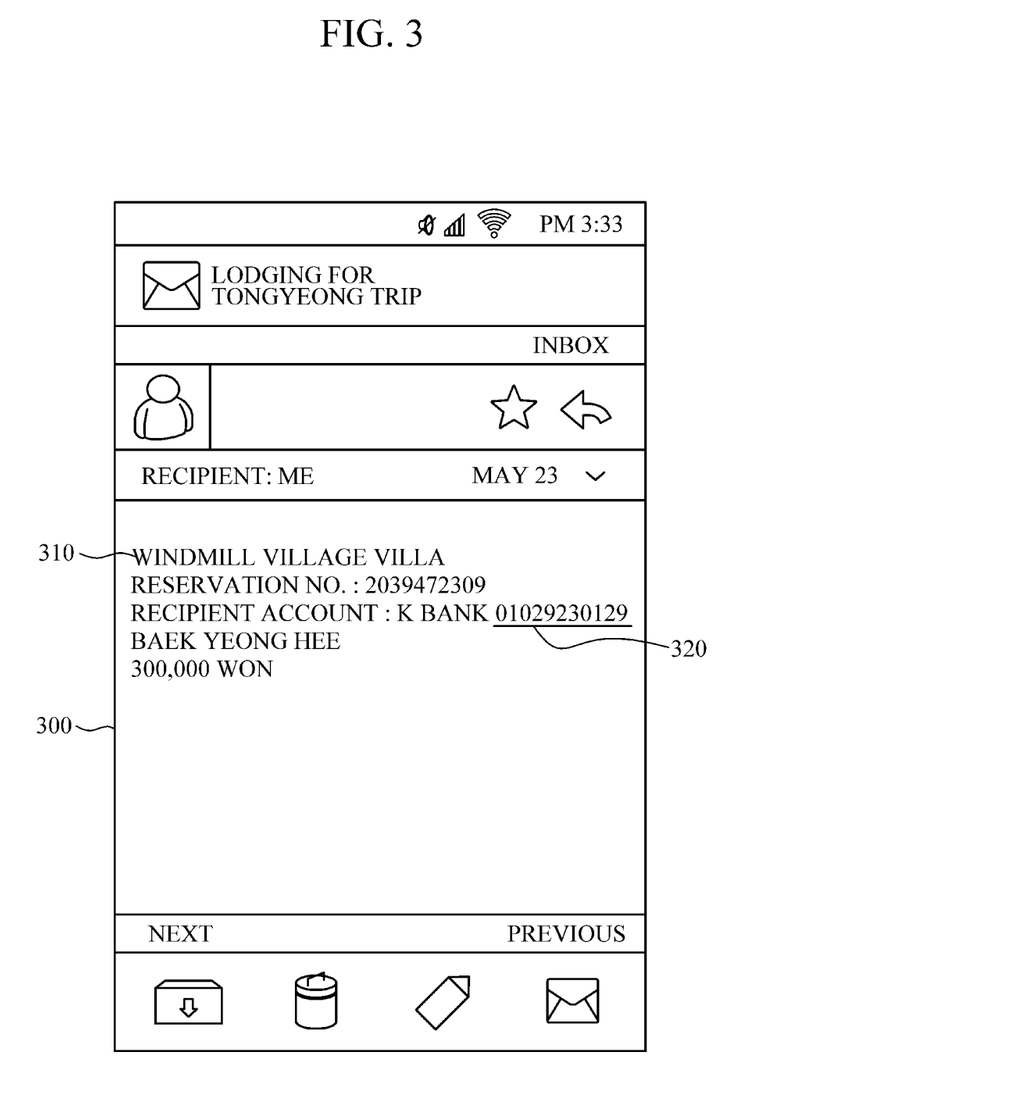
FIG. 3 is a diagram illustrating an example of text data.

FIG. 3 is a diagram illustrating an example of text data. As illustrated in FIG. 3, an application executed in an apparatus 100 of executing an application is an email application, and it is assumed that text data 300 is included in the received email.

FIGS. 4A to 4C and FIGS. 5A and 5B are diagrams illustrating examples of executing an application related to a text string selected by a user and inputting the string in the executed application.

Figure 4A:
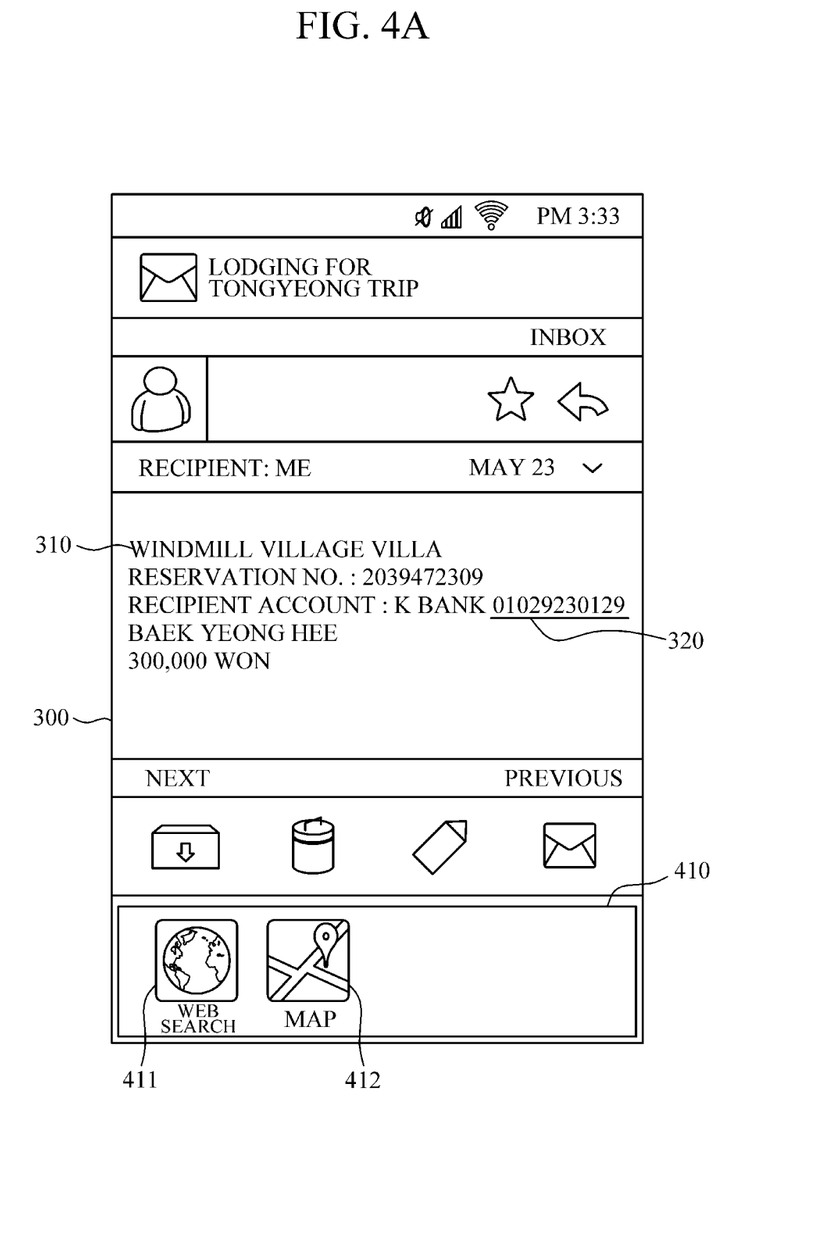
FIGS. 4A to 4C and FIGS. 5A and 5B are diagrams illustrating examples of executing an application related to a text string selected by a user and inputting the string in the executed application.

Referring to FIGS. 3 and 4A, when it is assumed that a user selects "a windmill village villa" 310 that is a text string included in the text data 300 illustrated in FIG. 3, a text string recognizer 110 may determine a type of the "windmill village villa" 310.

For example, the text string recognizer 110 may determine the type for the "windmill village villa" 310 as a place based the word "villa" included in the "windmill village villa" 310 being associated with a place. In case of an association model, in which an application associated with the text string of a place type is a map search application, and in which an application associated with the text string "windmill village villa" is a web search application, a determiner 130 may determine the web search application and the map search application as a candidate application.

In case of the association model, in which it is assumed that a location associated with the "windmill village villa" 310, among locations where the text string may be input in the web search application, is a search box, the determiner 130 may determine a search box of the web search application to be an input location of the "windmill village villa" 310.

In case of the association model, in which it is assumed that a location associated with the text string of the place type, among locations where the text string may be input in the map search application, is a search box, the determiner 130 may determine a search box of the map search application to be an input location of the "windmill village villa" 310.

Referring to FIG. 4A, an application list provider 140 may display a list 410 about a candidate application on a screen of the apparatus 100. Specifically, as illustrated in FIG. 4A, a web search application 411, and a map application or a map search application 412 both determined as the candidate application by the determiner may be included in the list 410.

When a frequency of the text string "windmill village villa" 310 input to the web search application 411 is greater than a frequency of the text string of the place type input to the map search application 412, the application list provider 140 may display the web search application 411 to before the map application 412 as illustrated in FIG. 4A.

Figure 4B:
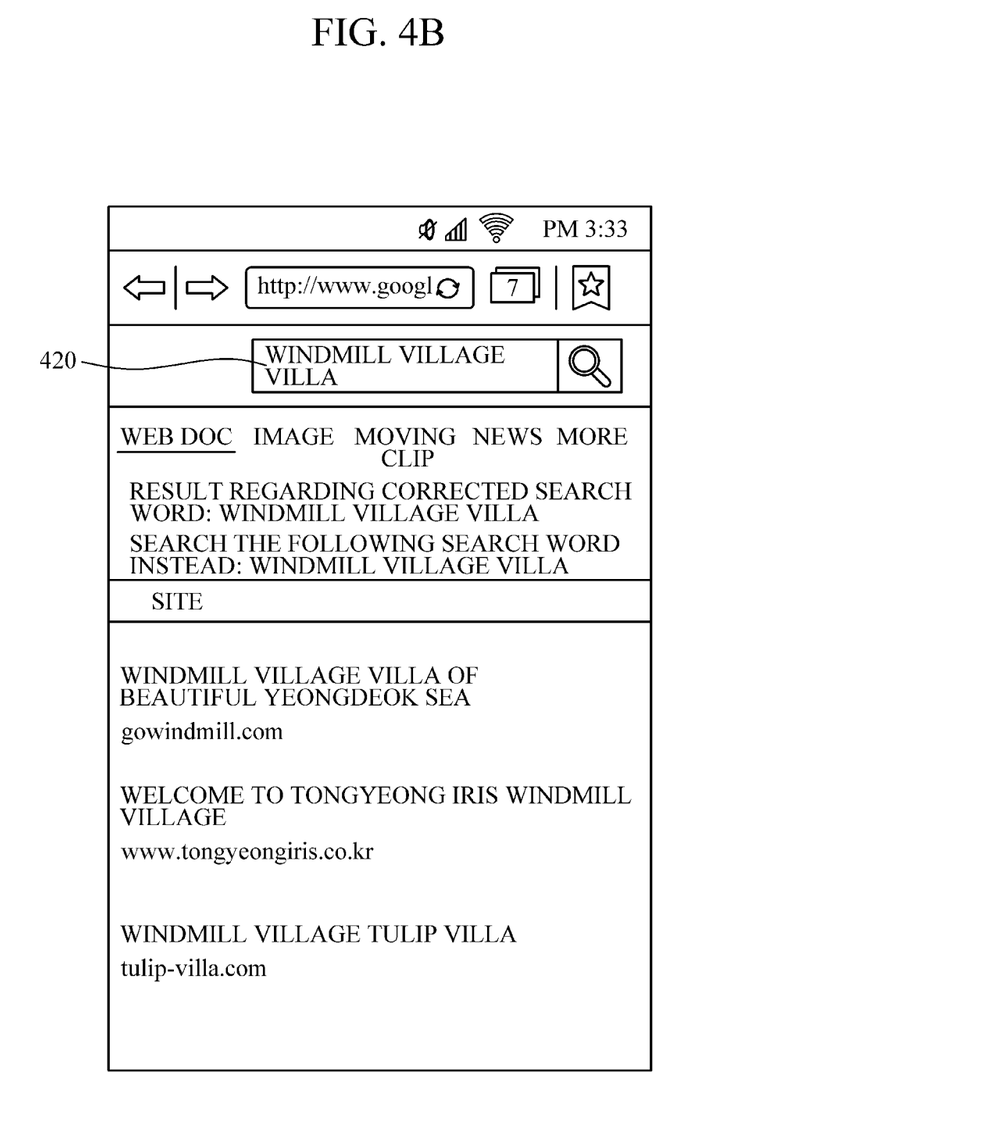

Referring to FIGS. 4A and 4B, when the user selects the web search application 411 from the list 410, an application executer 150 may execute the web search application 411. In addition, the application executer 150 may input the "windmill village villa" to a search box 420 of the web application, as shown in FIG. 4B.

Figure 4C:
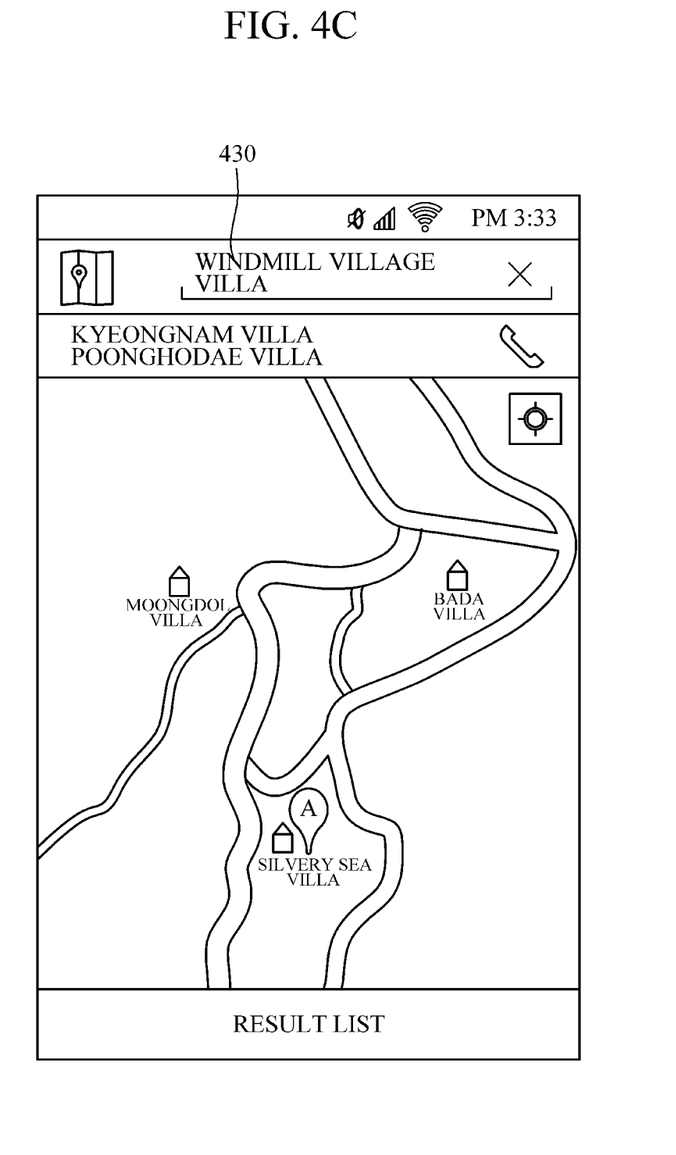

Referring to FIGS. 4A and 4C, when the user selects the map search application 412 from the list 410, the application executer 150 may execute the map search application 412. Also, the application executer 150 may input the "windmill village villa" to a search box of the map search application, as shown in FIG. 4C.

In a case where it is assumed that the user selects the text string "01029230129" 320 included in the text data 300 illustrated in FIG. 3, the text string recognizer 110 may determine the type of the selected text string "01029230129" 320.

For example, since the selected text string 320 is composed of numbers, the text string recognizer 110 may determine the type of the selected text string 320 to be "a phone number" or "an account number." In another example, the text string recognizer 110 may determine the selected text string 320 to be the "account number" because "K bank" and "recipient account" is present in front of the selected text string 320.

Figure 5A:
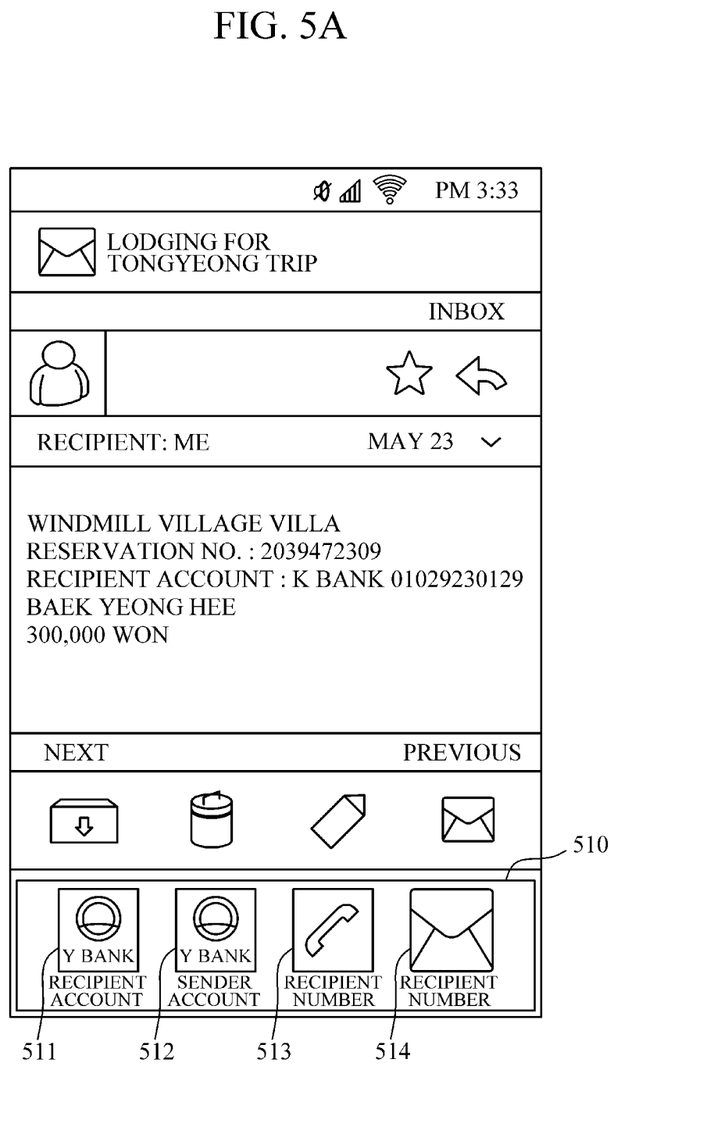

In a case where an application associated with a text string of a "phone number" type is a voice call application 513 and a text message application 514, the determiner 130 may determine the voice call application 513 and the text message application 514 as candidate applications. In a case of the text string input locations of the voice call application and the text message application, are the locations where a recipient number is input, the determiner 130 may determine the location where the recipient number may be input in the application to be locations where the selected text string 320 is to be input.

Moreover, in case of the association model, in which the application associated with the text string of the "account number" type is an internet banking application 511 or 512, the determiner 130 may determine the internet banking application as the candidate application. In case of the association model, in which the text string input location of the internet banking application associated with the text string of the "account number" type is a location where the recipient account number is input and a location where a withdrawal account number is input, the determiner 130 may determine the location where the recipient account number or the withdrawal account number is input in the internet banking application, as a location where the selected text string 320 is to be input.

Referring to FIG. 5A, the application list provider 140 may display a list 510 about a candidate application on a screen of the apparatus 100. Specifically, as illustrated in FIG. 5A, the list 510 may include internet banking applications 511 and 512, a voice call application 513, and a text message application 514, which are determined as the candidate application by the determiner 130.

As illustrated in FIG. 5A, a "recipient account", a "sender account", and a "recipient number" displayed at the bottom of the icons that indicate the candidate applications may indicate locations where the text string 320 selected by the user is to be input in the candidate application.

Figure 5B:
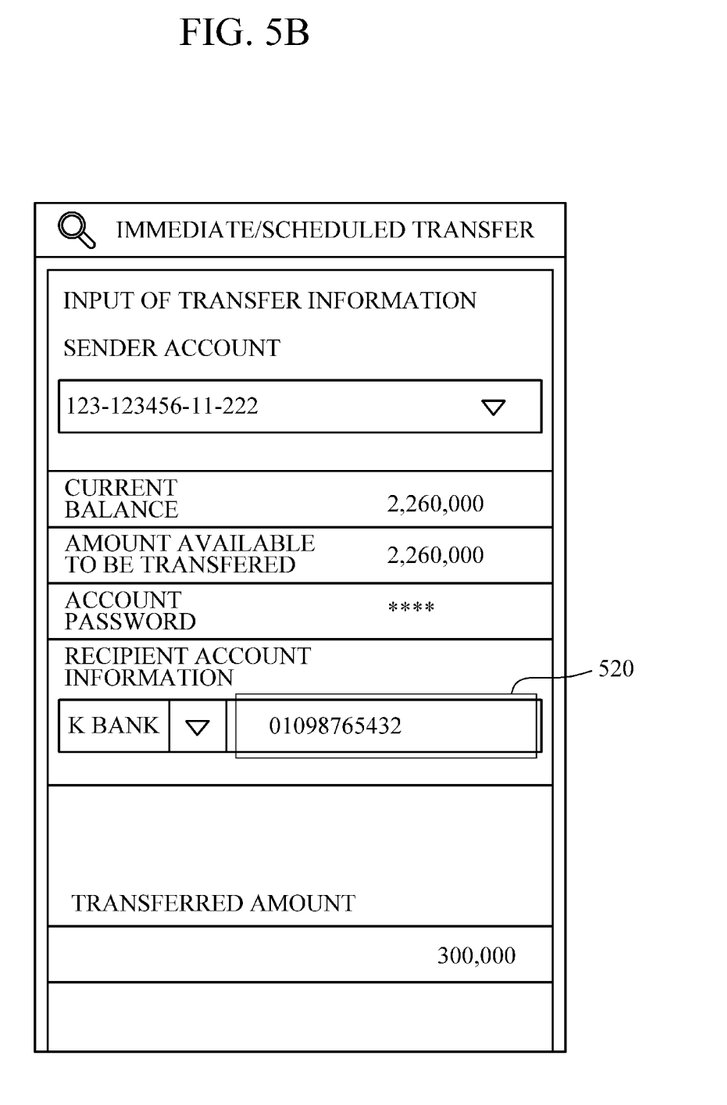

Referring to FIGS. 5A and 5B, when the user has selected a recipient account of the internet banking application 511 from the list 510, the application executer 150 may execute the internet banking application, and input the text string 320 selected by the user in FIG. 3 into a location 520 where the recipient account number is input in the executed internet banking application.

Figure 6:
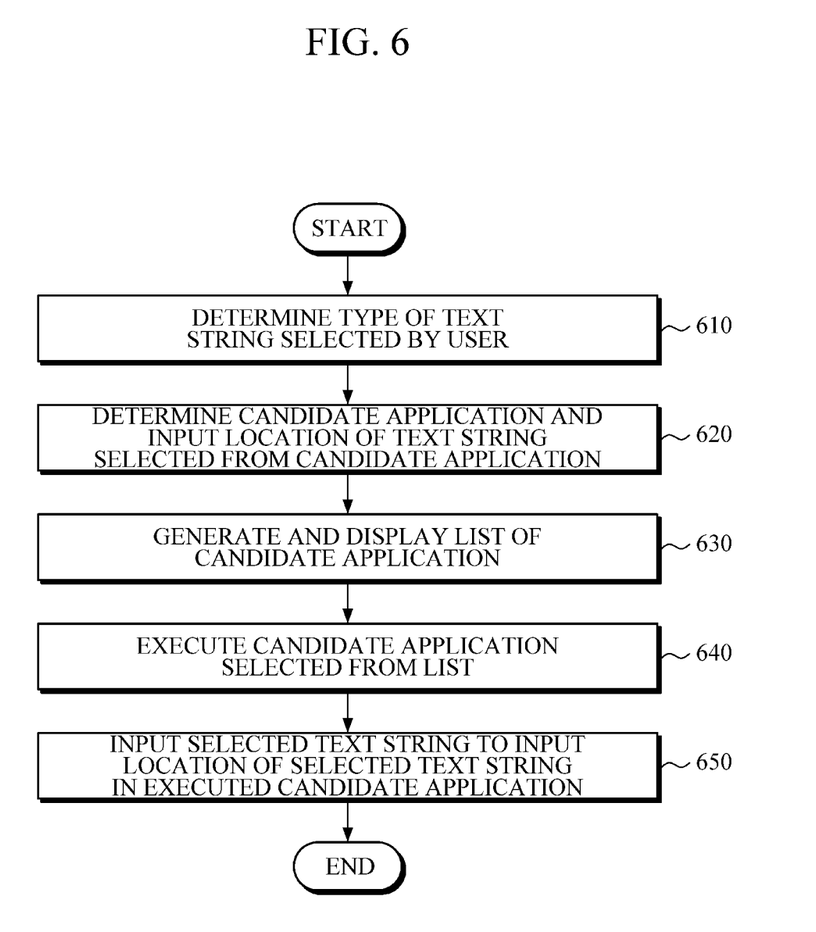
FIG. 6 is a diagram illustrating an example of a method of executing an application.

FIG. 6 is a diagram illustrating an example of a method for executing an application. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. The above descriptions of FIGS. 1-5B, is also applicable to FIG. 6, and is incorporated herein by reference. Thus, the above description may not be repeated here.

Referring to FIG. 6, an apparatus 100 of executing an application may determine a type of a text string selected by a user from text data in 610.

Then, the apparatus 100 may, based on an association model, determine a candidate application associated with the type of text string selected by the user, and an input location of the text string selected by the user from the candidate application in 620. The association model may include a text string, a type of the text string, an application, and an input location of the text string in the application. In an example, there may be one or more determined candidate applications and determined input locations of a text string The apparatus 100 may generate a list of candidate applications and display the list of candidate applications on a display screen in 630. Here, in an example, the list of candidate applications may include one or more applications associated with the type of text string selected by the user, and one or more input locations of the text strings selected in the one or more applications.

When one candidate application is selected from the list, the apparatus 100 may execute the selected candidate application in 640.

Then, the apparatus 100 may, in the executed candidate application, input the text string to the input location of the text string selected by the user in 650.

Figure 7:
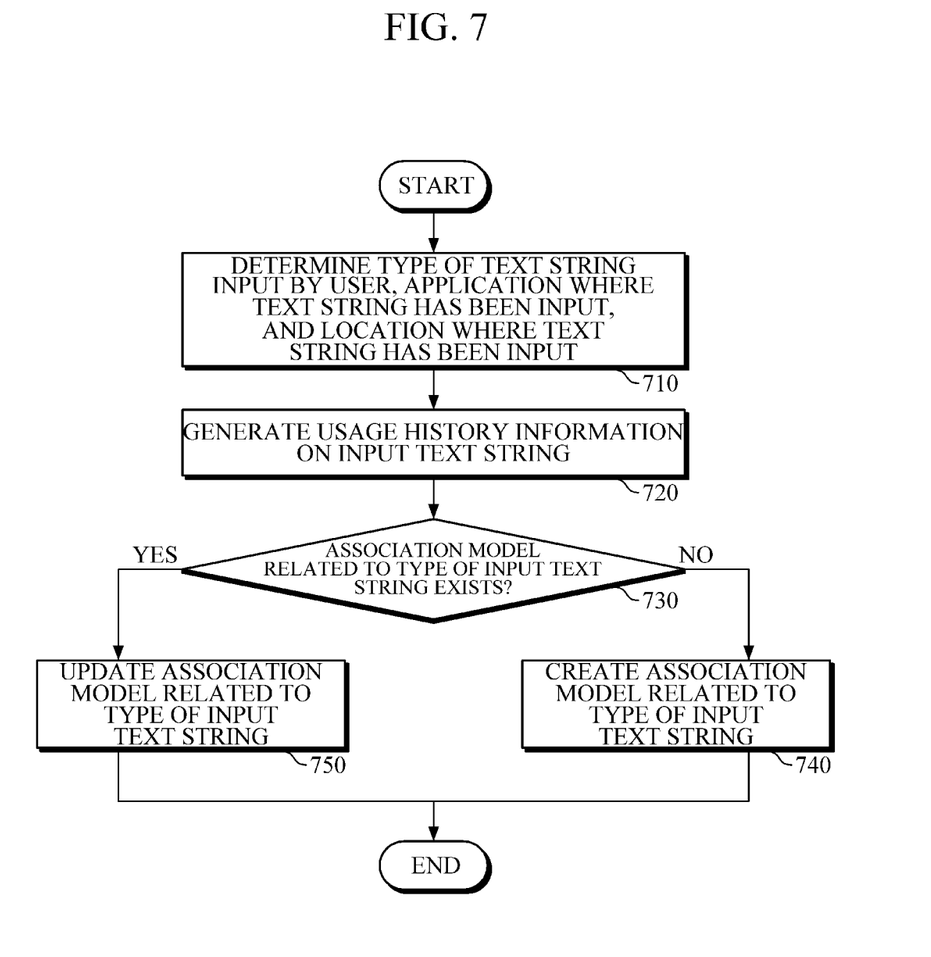
FIG. 7 is a diagram illustrating an example of a flowchart of a method of generating an association model.

FIG. 7 is a diagram illustrating an example a method for generating an association model. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. The above descriptions of FIGS. 1-6, is also applicable to FIG. 7, and is incorporated herein by reference. Thus, the above description may not be repeated here.

Referring to FIG. 7, when a user has input a text string, an apparatus of executing an application may determine a type of the input text string, an application where the text string has been input, and a location where the text string has been input in 710.

Then, the apparatus 100 may generate text string usage history information including the input text string, the type of the input text string, the application where the text string has been input, and the location where the text string has been input in 720.

Then, the apparatus 100 may, based on the generated text string usage history information, generate or update the association model between the text string and the application.

Specifically, the apparatus 100 may determine whether the association model related to the type of the text string input by the user exists in 730. If the association model related to the type of the text string does not exist, in 740, the apparatus 100 may create the association model with the generated usage history information.

If the association model related to the type of the text string input by the user exists, in 750, the apparatus 100 may update the existing association model with the generated usage history information.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, Wi-Fi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such as parallel processors.

The text string recognizer, association model storage, determiner, application list provider, association model manager, and application executer described herein may be implemented using hardware components, such as, for example a microprocessor. The microprocessor may be a multipurpose, programmable device that accepts digital data as input, processes it according to instructions stored in its memory, and provides results as output, such as, for example, Samsung's Exynos, Qualcomm's Snapdragon, NVIDIA's Tegra, Intel's Itanium, Intel's Xeon, Intel's Core i5, Intel's Core i7, Intel's Core 2, Intel's Pentium III, Intel's Pentium II, Intel's Celeron, Intel's Atom, DEC's Alpha 21064, DEC's Alpha 21164, DEC's Alpha 21264, DEC's Alpha 21364, and DEC's StrongARM.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A computing apparatus of executing an application, comprising: one or more processors configured to:
   recognize a text string from a first application, and determine a type of the text string using association information based on a word or sentence in close proximity to the text string;
   in response to a user selecting the text string being displayed in the first application, determine one or more candidate applications related to the selected text string, based on the type of the selected text string, using the association information; and
   generating a list of the one or more candidate applications, executing a candidate application selected from the list, and inputting the selected text string into an input location of the executed candidate application.

2. The apparatus of claim 1, wherein the type of the text string is determined to be any one or any combination of any two or more of a uniform resource locator (URL), an email address, an address or a location of a place, a name of the place, a phone number, an account number of a financial account, a name of a person, an ID, a password, a mark, an identifier of services and/or functionalities related to the text string, and an alphabet or a language character related to the text string.

3. The apparatus of claim 1, wherein the one or more processors are further configured to provide the text string and additional information associated with the text string to the second application.

4. The apparatus of claim 3, wherein an input location of the text string in the second application is determined based on at least one of the type of the text string and the additional information.

5. The apparatus of claim 3, wherein the additional information associated with the text string includes information about any one or any combination of any two or more of the text string, the type of the text string, and a predetermined input location in the second application where the text string is to be input.

6. The apparatus of claim 3, wherein the one or more processors are further configured to determine an input location of the text string in the second application, based on the type of the text string, using an association model, and
   wherein the additional information includes any one or any combination of any two or more of the text string, the type of the text string, and the determined input location and/or a predetermined input location for the text string.

7. The apparatus of claim 1, wherein an association model comprises the association information regarding the text string, the type of the text string, one or more applications, and/or at least one input location of the text string in the one or more applications, and
   wherein the one or more applications include the one or more candidate applications.

8. The apparatus of claim 7, wherein the association model is implemented using a classifier and is stored in a storage.

9. The apparatus of claim 1, wherein the text string from the first application is selected by the user.

10. The apparatus of claim 1, wherein the one or more processors are further configured to control a displaying of the one or more candidate applications in the list depending on a determined selection frequency of each application included in the list.

11. The apparatus of claim 1, wherein an association model comprises the association information regarding the type of the text string and an application associated with the type of the text string.

12. The apparatus of claim 1, wherein the one or more processors are further configured to generate usage history information on the text string and to generate or update an association model based on the usage history information, in response to the text string being selected or input by the user.

13. The apparatus of claim 12, wherein the usage history information comprises information regarding any one or any combination of any two or more of the text string, the type of the text string, an application where the text string has been input, and a location where the text string has been input in the application.

14. The apparatus of claim 1, wherein the one or more processors are configured to determine the type of the text string based on information about any one or any combination of any two or more of a form of the text string, content of the text string, a context of a text that includes the text string, a size of the text string, a pattern of the text string, a location where the text string is selected, a location where the text string is input or presented, and words or sentences positioned in a front or back of the text string.

15. A method for executing an application, the method performed by a computing apparatus comprising:
   recognizing a text string from a first application, and determining a type of a text string using association information based on a word or sentence in close proximity to the text string;
   in response to a user selecting the text string being displayed in the first application, determining one or more candidate applications related to the type of the selected text string, based on the type of the selected text string, using the association information; and
   generating a list of the one or more candidate applications, executing a candidate application selected from the list, and inputting the selected text string into an input location of the executed candidate application.

16. The method of claim 15, wherein the type of the text string is determined to be any one or any combination of any two or more of a uniform resource locator (URL), an email address, an address or a location of a place, a name of the place, a phone number, an account number of a financial account, a name of a person, an ID, a password, a mark, an identifier of services and/or functionalities related to the text string, and an alphabet or a language character related to the text string.

17. The method of claim 15, wherein an association model comprises the association information regarding the text string, the type of the text string, one or more applications, and an input location of the text string in the one or more applications, and wherein the one or more applications include the one or more candidate applications.

18. The method of claim 17, wherein the association model is implemented using a classifier and is stored in a storage.

19. The method of claim 15, wherein an association model comprises the association information regarding the type of the text string and an application associated with the type of the text string.

20. The method of claim 15, wherein an association model is generated based on usage history information of the text string selected or input by the user, and wherein the usage history information comprises information regarding the text string selected or input by the user, the type of the text string, an application where the text string has been input, and a location where the text string has been input in the application.

21. The method of claim 15, wherein the determining of the type of the text string comprises determining the type of the text string based on information about any one or any combination of any two or more of a form of the text string, content of the text string, a context of a text that includes the text string, a size of the text string, a pattern of the text string, a location where the text string is selected, a location where the text string is input, and words or sentences positioned in a front or back of the text string.

22. The method of claim 15, further comprising providing the text string and additional information associated with the text string to the second application.

23. The method of claim 22, wherein the additional information associated with the text string includes information about any one or any combination of any two or more of the text string, the type of the text string, and a predetermined input location in the second application where the text string is to be input.

24. The method of claim 15, further comprising determining an input location of the text string in the second application using an association model, and providing additional information including any one or any combination of any two or more of the text string, the type of the text string, and the determined input location or a predetermined input location, to the second application.

25. The method of claim 15, wherein an input location of the text string in the second application is determined, using at least one of the type of the text string and additional information.

26. A method, performed by a computing apparatus, for executing an application, the method comprising:

recognizing a text string from a first application;

in response to a user selecting the text string being displayed in the first application, determining, using association information, one or more candidate applications related to a determined type of the selected text string, based on the determined type of the selected text string, the determined type of the selected text string being determined based on a word or sentence in close proximity to the text string;

executing a second application selected from a generated list of the one or more candidate applications in response to the user selecting the second application from the generated list, the generated list of the one or more candidate applications being generated depending on a determined selection frequency of each application included in the list; and inputting the selected text string into an input location of the executed second application.

\* \* \* \* \*